US00RE47549E

(19) United States
(12) Reissued Patent
Laitta et al.

(10) Patent Number: US RE47,549 E
(45) Date of Reissued Patent: Aug. 6, 2019

(54) HANDRAIL

(71) Applicant: S.R. Smith, LLC, Canby, OR (US)

(72) Inventors: Richard P. Laitta, Canby, OR (US); Darrin Johnson, Portland, TN (US)

(73) Assignee: S.R. Smith, LLC, Canby, OR (US)

(21) Appl. No.: 29/515,597

(22) Filed: Jan. 23, 2015

Related U.S. Patent Documents

Reissue of:
(64) Patent No.: Des. 706,451
Issued: Jun. 3, 2014
Appl. No.: 29/462,252
Filed: Jul. 31, 2013

(51) LOC (12) Cl. ..... 25-02
(52) U.S. Cl.
USPC ..... D25/41.1
(58) Field of Classification Search
USPC ..... D25/38.1, 41.1, 43, 44, 119, 122, 124; D26/138, 155

(Continued)

(56) References Cited

U.S. PATENT DOCUMENTS

D194,835 S * 3/1963 Prizler et al. ..... D12/414
3,494,596 A * 2/1970 Bellinson ..... E04F 11/1851 256/24

(Continued)

OTHER PUBLICATIONS

Pool Jewels, Rail Goods, web page <http://pooljewels.com/railgoods.html>, 1 page, Dec. 19, 2011 retrieved from Internet Archive < https://web.archive.org/web/20091231145933/http://pooljewels.com/railgoods.html > on Feb. 4, 2015.

(Continued)

*Primary Examiner* — Darlington Ly
(74) *Attorney, Agent, or Firm* — Stoel Rives LLP

(57) CLAIM

We claim the ornamental design for a handrail, as shown and described.

DESCRIPTION

*This application is a broadening reissue of U.S. Pat. No. D706,451 which issued Jun. 3, 2014 from application Ser. No. 29/462,252 filed Jul. 31, 2013.*

*Notice: More than one reissue application has been filed for the reissue of U.S. Pat. No. D706,451. The reissue applications are application Ser. No. 29/515,597 (the present application), and divisional application application Ser. No. 29/626,577 filed Nov. 17, 2017.*

FIG. 1 is a perspective view of a handrail[.] *showing our new design;*

FIG. 2 is a front elevation view of the handrail of FIG. 1[. The], *the* opposing rear elevation view is a mirror image [of the illustrated view.] *thereof;*

FIG. 3 is a top plan view of the handrail of FIG. 1[.];

FIG. 4 is a bottom plan view of the handrail of FIG. 1[.];

FIG. 5 is a left side elevation view of the handrail of FIG. 1; and,

FIG. 6 is a right side elevation view of the handrail of FIG. 1.

[In FIGS. 1-6, the] *The* broken lines [indicate environmental features and] *in the drawings illustrate portions of the handrail that* form no part of the claimed design.

1 Claim, 1 Drawing Sheet

Matter enclosed in heavy brackets [ ] appears in the original patent but forms no part of this reissue; matter printed in italics indicates the additions made by reissue.

(58) Field of Classification Search
CPC ... E04F 11/18; E04F 11/1802; E04F 11/1808; E04F 11/1836; E01F 15/0453; B63B 17/04
See application file for complete search history.

(56) References Cited

U.S. PATENT DOCUMENTS

| | | | | | |
|---|---|---|---|---|---|
| 4,077,173 | A | * | 3/1978 | Rozanski | E04H 4/00 4/506 |
| 4,887,323 | A | * | 12/1989 | DiVito et al. | A47K 3/003 4/511 |
| 5,333,323 | A | * | 8/1994 | Aymes | E04H 4/144 182/93 |
| 5,384,927 | A | * | 1/1995 | Mardero | A61G 7/053 248/289.11 |
| 5,727,264 | A | * | 3/1998 | Craig et al. | E04H 4/0037 4/489 |
| D409,311 | S | * | 5/1999 | Victor et al. | D25/41.1 |
| D417,287 | S | * | 11/1999 | Victor | D25/41.1 |
| 6,185,875 | B1 | * | 2/2001 | Victor et al. | E04H 3/123 256/59 |
| 6,601,245 | B2 | * | 8/2003 | Weiss | E04H 4/144 182/106 |
| 6,854,216 | B2 | * | 2/2005 | Ahrens | A47C 1/126 52/183 |
| D589,629 | S | * | 3/2009 | French | D25/41.1 |
| D608,018 | S | * | 1/2010 | Stimpson et al. | D25/41.1 |
| D706,448 | S | * | 6/2014 | Laitta | D25/41.1 |
| D706,449 | S | * | 6/2014 | Laitta | D25/41.1 |
| D706,450 | S | * | 6/2014 | Laitta | D25/41.1 |
| D706,451 | S | * | 6/2014 | Laitta | D25/41.1 |
| D706,452 | S | * | 6/2014 | Laitta | D25/41.1 |
| D710,122 | S | * | 8/2014 | Skalka | D6/370 |
| D710,624 | S | * | 8/2014 | Skalka | D6/370 |
| D710,626 | S | * | 8/2014 | Skalka | D6/370 |
| D711,174 | S | * | 8/2014 | Skalka | D6/717 |
| D711,175 | S | * | 8/2014 | Skalka | D6/717 |
| D711,176 | S | * | 8/2014 | Skalka | D6/717 |
| D722,921 | S | * | 2/2015 | Skalka | D12/115 |
| D725,792 | S | * | 3/2015 | Cullen | D25/38.1 |
| D726,473 | S | * | 4/2015 | Skalka | D6/717 |
| D726,474 | S | * | 4/2015 | Skalka | D6/717 |
| D727,669 | S | * | 4/2015 | Skalka | D6/717 |
| D735,091 | S | * | 7/2015 | Slaughenhoupt | D12/115 |
| D756,531 | S | * | 5/2016 | Hagerty | D25/41.1 |
| D783,858 | S | * | 4/2017 | Hixon | D25/41.1 |
| 2001/0006231 | A1 | * | 7/2001 | McCracken | E04D 11/00 256/59 |

OTHER PUBLICATIONS

Pool Jewels, Rail Goods, pooljewels.com/railgoods.html, publicly available at least as of Jan. 17, 2013, last visited Aug. 7, 2013, 2 pages.

* cited by examiner

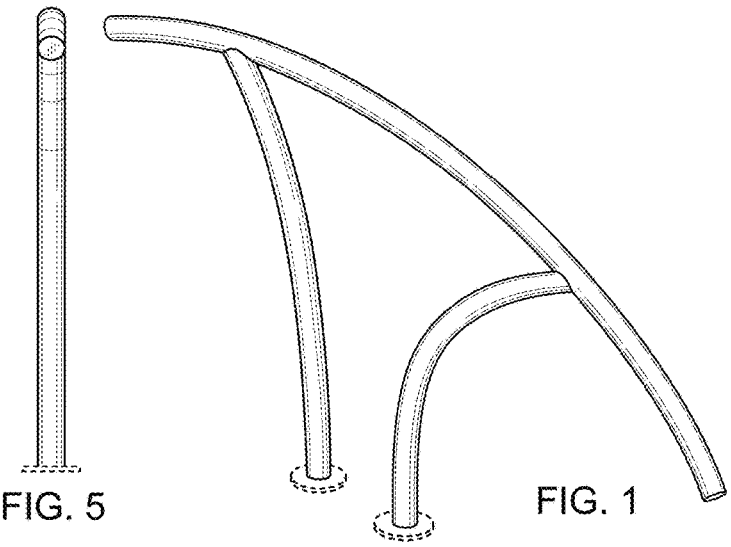
FIG. 5
FIG. 1
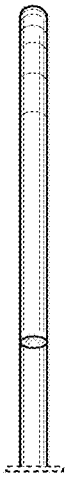
FIG. 6
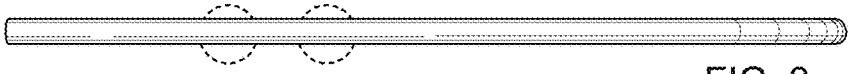
FIG. 3
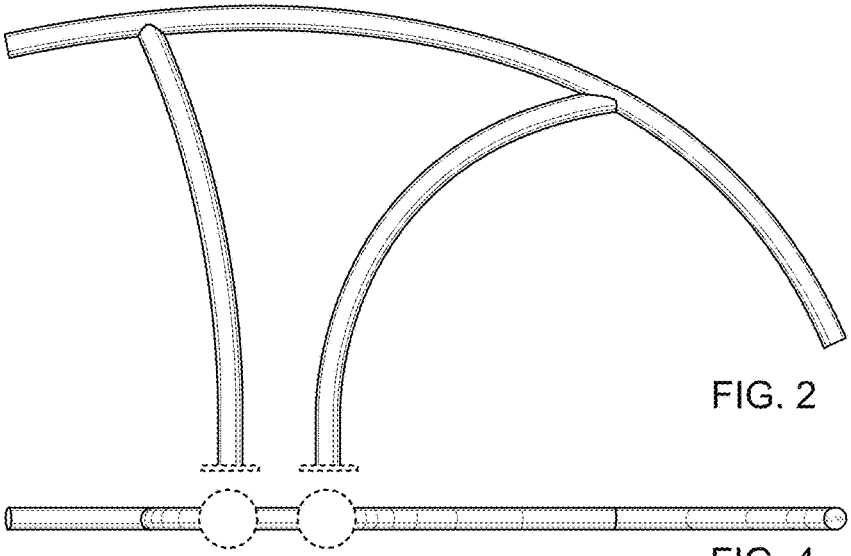
FIG. 2
FIG. 4